(No Model.)
J. OLDHAM.
BAND SAW HAMMERING APPLIANCE.
No. 531,960. Patented Jan. 1, 1895.
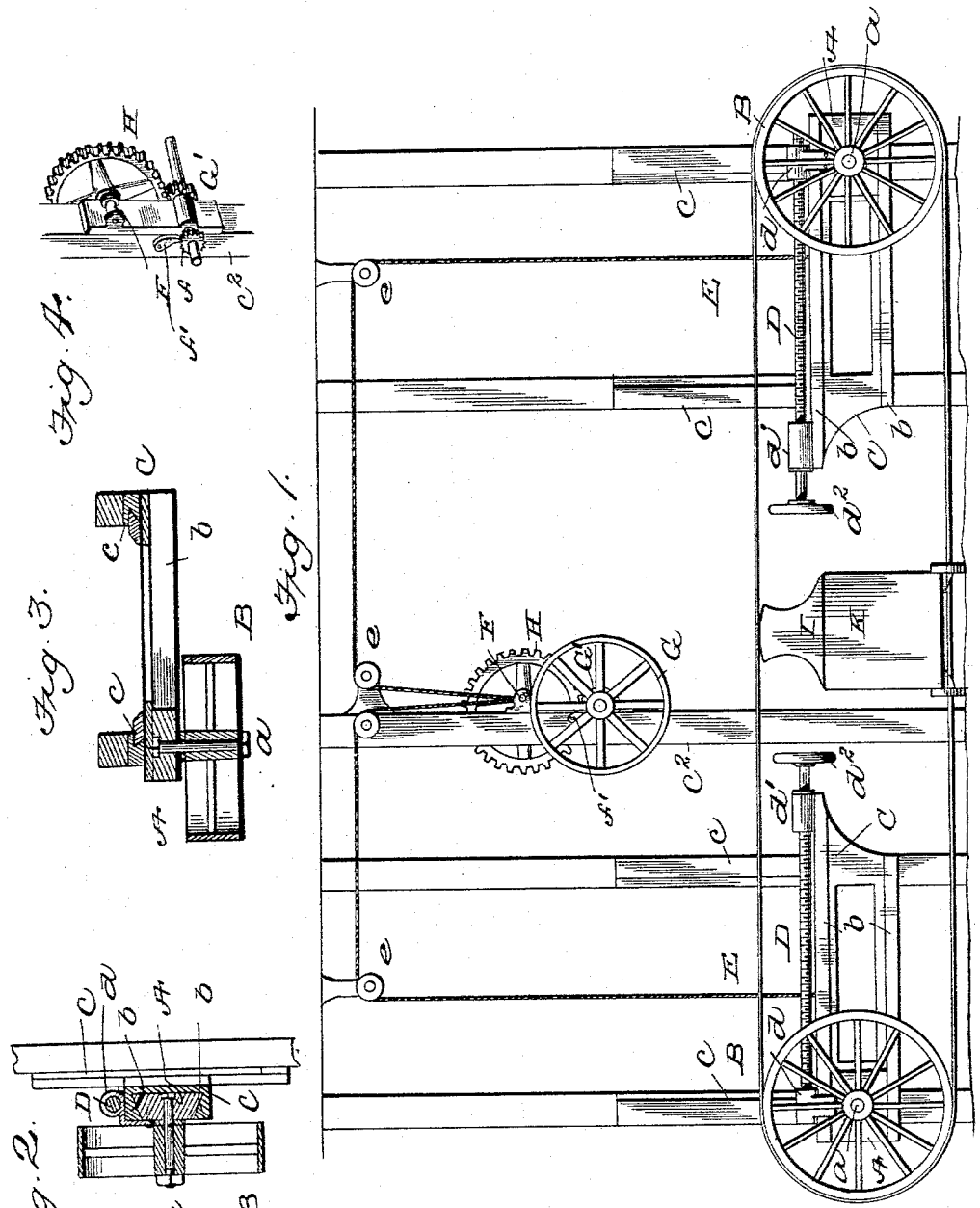
Witnesses
Inventor
Joshua Oldham
By
His Attorney

UNITED STATES PATENT OFFICE.

JOSHUA OLDHAM, OF BROOKLYN, NEW YORK.

BAND-SAW-HAMMERING APPLIANCE.

SPECIFICATION forming part of Letters Patent No. 531,960, dated January 1, 1895.

Application filed August 18, 1894. Serial No. 520,668. (No model.)

*To all whom it may concern:*

Be it known that I, JOSHUA OLDHAM, a citizen of the United States, residing at Brooklyn, in the county of Kings and State of New York, have invented certain new and useful Improvements in Band-Saw Appliances; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in appliances for manipulating band-saws while hammering the same to get the proper tension, and it has for its object to greatly reduce the labor, and expedite the operation, of effecting the same, and to these ends the invention consists of the mechanism substantially as hereinafter fully described, and specifically claimed for carrying out the purposes thereof.

In the accompanying drawings, Figure 1 is a front elevation of my invention. Fig. 2 is a detailed section taken vertically through one of the band-saw wheel mandrel or axle carriage guides. Fig. 3 is also a detailed section taken horizontally through one set of the carriage-guide ways. Fig. 4 is a broken detail showing more especially the gear-operating mechanism for the raising and lowering, or vertical adjustment of the carriage-guides.

In the embodiment of my invention, I employ two plates or carriages A carrying mandrels or axles $a$ $a$ upon which are placed pulleys B around which, as shown, is stretched the band saw for hammering.

C C are guides or frames vertically adjustable in guides $c$ secured upon uprights $c'$ and upon the front side of said frames move or slide the plates or carriages A, having angular or beveled longitudinal edges engaging corresponding flanges $b$ of the said frames or guides, serving as ways therefor.

D D are screws passing through and working at one end in screw threaded eyes or sockets $d$ fixed to the carriages or plates A, and provided at their opposite ends with handwheels $d^2$ and supported near said ends, in bearings $d'$ secured or cast upon the carriage-guides C at their inner ends, whereby the carriages or plates A are adapted to be readily moved back and forth along said guides or frames to permit the tightening of the saw sufficiently for the operator to draw the saw back and forth by hand and to loosen it for fixing or otherwise manipulating or removing the saw, and to permit of the placing of saws of variable size around the pullyes B borne by the mandrels or axles $a$ $a$ carried by said carriages.

The vertically adjustable carriage-guides C are raised and lowered by the ropes or cables E E, connected thereto respectively, and passed over pulleys $e$ $e$, suitably hung in elevated position, and thence passed to, and around, a cylinder or roll F suitably journaled, together with a large hand-wheel G, upon an upright $c^2$, whose shaft is geared by a pinion G' thereon, with a large gear wheel H on the shaft of the cylinder or roll F, whereby, by turning the wheel G, in the required direction, it will be seen that the rope E will be wound or unwound according as it may be desired to raise or lower the carriage guides.

On the same shaft bearing the wheel H is a ratchet $f$ engaged by a pawl $f'$ suitably hung on the upright $c^2$, to prevent the turning of said shaft when the appliance is elevated.

I is an anvil secured upon a block or support K mounted upon trucks or wheels and sufficiently elevated to allow the saw to pass freely thereunder.

It will be apparent from the above that the saw can be readily moved along, or to and fro, for hammering the relatively outer side upon the anvil adjusted thereto as shown, and, after having been thus hammered, and the anvil moved out of the way the entire movable appliance, with the saw, can then be adjusted so as to present the outer side of the saw to the anvil the latter having been moved back to its original position to permit the hammering of the opposite or inner side of the saw, until the required tension is imparted thereto, as well understood by artisans in this class of work.

Having thus fully described my invention, what I claim, and desire to secure by Letters Patent, is—

1. In a saw-manipulating appliance, the combination of the carriage-guides, carriages fitted to move therein and having means to provide for the straining of a band saw thereon, and mechanism for bodily and simultaneously adjusting said carriage-guides, with the carriages and saw, vertically, as set forth.

2. In a saw-manipulating appliance, the combination of the carriage-guides having longitudinal guide-ways, the carriages fitted to move in said guide-ways and bearing axles provided with pulleys or wheels, around which a band-saw may be strained, hand-screws bearing upon said carriage-guides and connected to said carriages, mechanism for effecting the simultaneous, vertical movement of said carriage-guides and vertical guide-ways for said carriage guides, substantially as set forth.

3. The saw manipulating appliance for hammering purposes comprising the carriages or plates having mandrels or axles bearing pulleys around which is adapted to be stretched a band-saw, means for effecting the to and fro movement or adjustment of said carriages, the vertically adjustable guides or frames supporting said carriages and means for adjusting said frames, whereby the saw can be manipulated so as to present its relatively inner and outer surfaces or sides to a movably mounted anvil sufficiently elevated to permit the saw to freely pass thereunder, substantially as set forth.

In testimony whereof I affix my signature in presence of two witnesses.

JOSHUA OLDHAM.

Witnesses:
CHARLES F. AUKAMP,
HARRY TAFT.